UNITED STATES PATENT OFFICE.

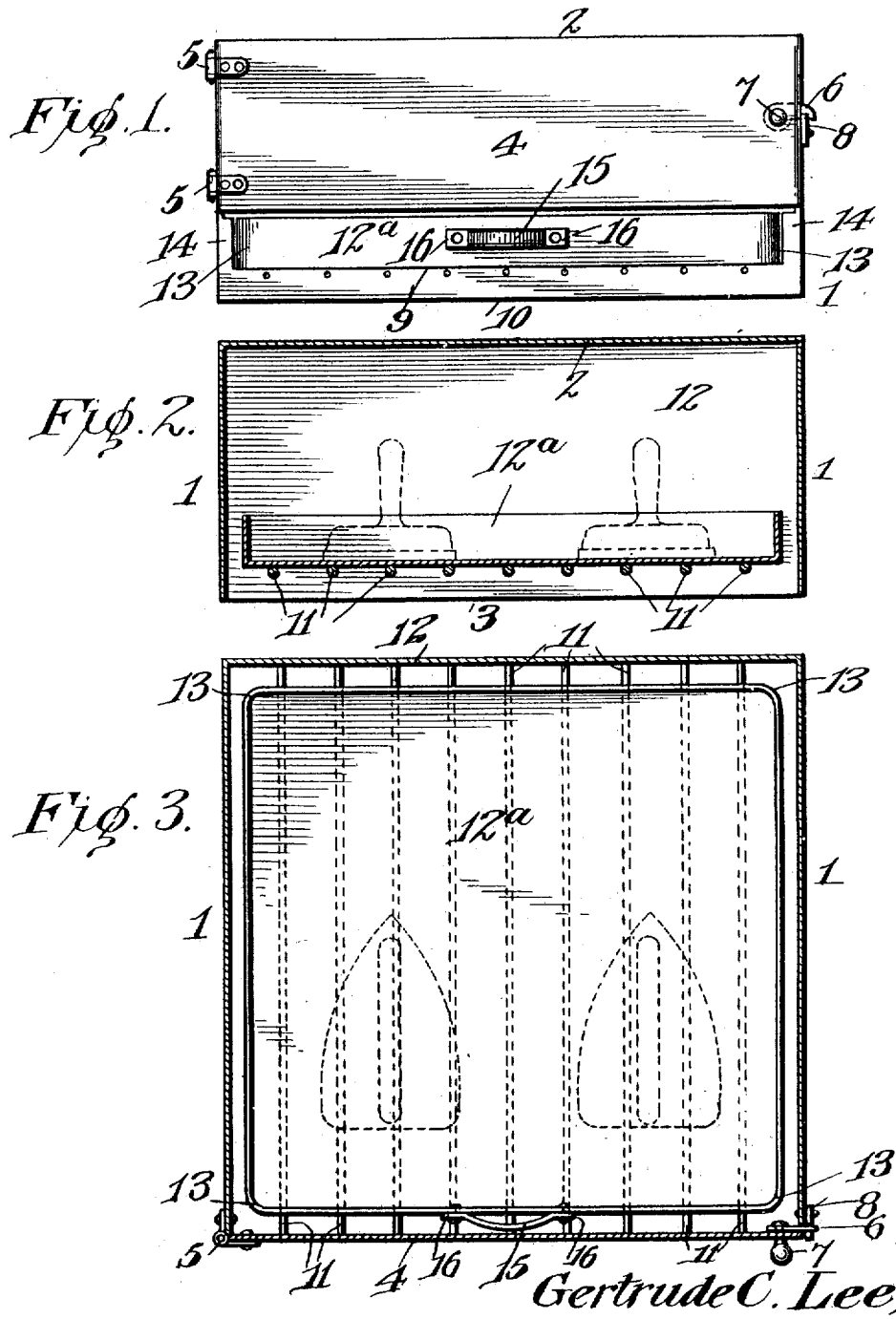

GERTRUDE C. LEE, OF OAKLAND, CALIFORNIA.

SAD-IRON HEATER.

945,557.　　　Specification of Letters Patent.　　Patented Jan. 4, 1910.

Application filed February 6, 1909.　Serial No. 476,455.

*To all whom it may concern:*

Be it known that I, GERTRUDE C. LEE, a citizen of the United States, residing at Oakland, in the county of Alameda and State of California, have invented certain new and useful Improvements in Sad-Iron Heaters, of which the following is a specification, reference being had therein to the accompanying drawing.

This invention relates to sad iron heaters and has specially in view a device of the character described in which the irons may be held directly over the products of combustion from a gas or other stove so that the same may be quickly and thoroughly heated, and at the same time readily permit the irons to be removed from the heater without inserting the hands or a grasping tool therein, thus obviating danger to the user.

With the above and other objects in view, the invention contemplates a heating receptacle closed at the top and open at the bottom so that the same may be placed over a stove to cause the heat to circulate over and about a removable sad iron holder which is slidably mounted within the receptacle, the closed top of the receptacle being flat so that it may be used for cooking purposes if desired.

In carrying out the objects of the invention generally stated above it will, of course, be understood that the essential features thereof are susceptible of changes in details and structural arrangements, but a preferred and practical embodiment of the same is shown in the accompanying drawings wherein—

Figure 1 is a front view of the improved sad iron heater. Fig. 2 is a central vertical sectional view thereof, showing by dotted or broken lines the arrangement of sad irons therein. Fig. 3 is a central transverse sectional view.

Referring to said drawings by numerals, 1 designates the casing of the heater which is substantially rectangular in shape and provided with a closed flat top 2 and an open bottom 3. One side of said casing is open and provided with a door 4 that extends entirely across the open side of the casing and is mounted upon a pair of strap hinges 5. A latch 6 is carried by said door, said latch being operated by means of a knob or button 7 to engage with or be disengaged from a keeper 8. Said door 4 does not extend to the bottom of the side of the casing to which it is attached, but its lower or bottom edge terminates just above the top edges of a cut-out portion 9 of a front sheet 10 which communicates with the open side of the casing and forms a support for one end of a plurality of spaced apart bars 11 which extend across the lower portion of the casing and have their other ends supported in the rear sheet 12 of the casing.

It will be observed by reference to Fig. 1 of the drawings that the supporting bars 11 are carried by the horizontal portion of the cut-out portion of the front sheet and are located adjacent to the upper edge thereof. Said bars 11 form the support for a shallow removable sad iron holding pan 12$^a$ the corners 13 of which are rounded to facilitate the passage of said pan through the cut out portion of the front sheet and onto said supporting bars, and also to facilitate the removal of said pan therefrom. The pan is substantially the same height as the end walls 14 of the notched or cut out portion, so that when therein, the said notched or cut out portion will be closed. The pan is provided with a handle 15 which may be formed of a single length of material which is outwardly bowed at its intermediate portion and having straight ends 16 which are riveted or otherwise secured to said pan.

It will be observed that the described heater is of especial advantage for use in connection with the heating of sad irons having detachable handles, for the reason that the same may readily be introduced into and removed from the receptacle by the use of the shallow pan without the necessity of opening the door thereof, thereby preventing loss of heat; but when sad irons provided with permanent handles are being heated, or articles too large to be passed through said opening, they may be readily removed or introduced by opening said door.

While the irons are heating, it will be obvious that the flat top 2 of the heater may be used for cooking, water heating, or other purposes.

It will be seen from the foregoing that the invention is one in which the irons may be quickly and thoroughly heated for the reason that as the casing practically retains all the heat that enters it there is little danger of any outside or cooler air entering. And it will also be understood that the spaced apart bars form an open shelf for the pan which permits the heat to have a direct contact with the bottom thereof, and as said pan is of less width than the casing, the heat will be deflected by contact with said bottom and caused to circulate around the sides of the pan and over and about the top thereof.

I claim as my invention:—

1. A sad iron heater comprising a casing having an open bottom and a sealed flat top adapted for cooking purposes, one side of said casing being provided with a doorway and below the same being provided with a horizontally-arranged cut-away portion in communication with said doorway, a door for said doorway, spaced-apart parallel bars extending transversely across the lower portion of said casing, and a sad iron holding pan adapted to be passed through said cut-away portion and seated upon said supporting bars.

2. A sad iron heater comprising an open bottom casing having a flat closed top adapted for cooking purposes, one side of said casing being provided with a doorway and below said doorway with a cut out portion in communication with said doorway, spaced apart bars extending transversely across the interior of said casing and having one of their ends supported below the cut out portion of the said side of the casing, and a sad iron holding pan provided with a handle and adapted to be seated on said spaced apart bars and to be removed therefrom through said cut out portion.

3. A sad iron heater comprising a casing having a flat closed top, an open bottom, and a side doorway, a door hinged to one side of said doorway, said casing being also provided with a cut out portion below and in communication with said doorway, a shelf extending across said casing below the cut-out portion and composed of spaced apart parallel bars, and a sad iron carrying pan provided with round corners to facilitate its passage through the cut-out portion, said pan being supported within the casing by said shelf.

In testimony whereof I hereunto affix my signature in presence of two witnesses.

GERTRUDE C. LEE.

Witnesses:
H. C. SCHROEDER,
F. P. SCHROEDER.